(12) United States Patent
Cha et al.

(10) Patent No.: US 11,541,782 B2
(45) Date of Patent: Jan. 3, 2023

(54) COCKPIT MODULE FOR VEHICLE

(71) Applicants: Hyundai Motor Company, Seoul (KR); Kia Motors Corporation, Seoul (KR)

(72) Inventors: Dong Eun Cha, Hwaseong-si (KR); Jin Ho Hwang, Cheonan-si (KR); Sang Heon Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 233 days.

(21) Appl. No.: 17/165,041

(22) Filed: Feb. 2, 2021

(65) Prior Publication Data
US 2022/0063450 A1    Mar. 3, 2022

(30) Foreign Application Priority Data

Sep. 3, 2020  (KR) .......................... 10-2020-0112112

(51) Int. Cl.
*B60N 2/02*  (2006.01)
*B60N 2/30*  (2006.01)
*B60N 2/06*  (2006.01)

(52) U.S. Cl.
CPC .............. *B60N 2/0292* (2013.01); *B60N 2/06* (2013.01); *B60N 2/3031* (2013.01); *B60N 2/3065* (2013.01); *B60N 2/3097* (2013.01)

(58) Field of Classification Search
CPC ...... B60N 2/0292; B60N 2/06; B60N 2/3031; B60N 2/3065; B60N 2/2222; B60N 2/3097; B62D 1/183; B62D 1/185

USPC ...................... 296/65.01, 65.11, 65.05, 65.16
See application file for complete search history.

(56) References Cited

U.S. PATENT DOCUMENTS

| | | | |
|---|---|---|---|
| 10,442,316 B2 * | 10/2019 | Ahn | ......................... B60N 2/01 |
| 2009/0302632 A1 * | 12/2009 | Kuno | ................... B60N 2/3065 |
| | | | 296/65.09 |
| 2017/0225570 A1 * | 8/2017 | El Aile | ................. B60R 21/203 |
| 2020/0001815 A1 * | 1/2020 | Minakawa | ............ B60R 21/205 |
| 2020/0009991 A1 | 1/2020 | Ahn et al. | |
| 2020/0156525 A1 * | 5/2020 | Lee | ......................... A61H 39/04 |
| 2020/0283054 A1 * | 9/2020 | Murayama | ............. B60N 3/001 |
| 2021/0370810 A1 * | 12/2021 | Hwang | ................ B60N 2/3088 |
| 2022/0315093 A1 * | 10/2022 | Ahn | ........................ B62D 1/185 |

FOREIGN PATENT DOCUMENTS

| | | | | |
|---|---|---|---|---|
| DE | 102016113169 A1 * | 1/2017 | ............. | B60K 37/00 |
| EP | 1834833 A2 * | 9/2007 | ............. | B60N 2/045 |

* cited by examiner

*Primary Examiner* — D Glenn Dayoan
*Assistant Examiner* — Wenwei Zhuo
(74) *Attorney, Agent, or Firm* — Morgan, Lewis & Bockius LLP

(57) ABSTRACT

A cockpit module for a vehicle is introduced, which includes a dashboard provided in front or in the rear of an internal space of the vehicle; a control panel provided in an upper portion of the dashboard and configured of facilitating an occupant to operate the control panel by being accommodated in the dashboard when moving backward thereof and by being deployed toward the occupant when moving forward thereof; and a seat being accommodated in a lower portion of the dashboard in a folded state, and being disposed in the front facing the dashboard when being deployed to be provided to the occupant.

15 Claims, 4 Drawing Sheets

COCKPIT MODULE FOR VEHICLE

CROSS REFERENCE TO RELATED APPLICATION

The present application claims priority to Korean Patent Application No. 10-2020-0112112 filed on Sep. 3, 2020, the entire contents of which is incorporated herein for all purposes by this reference.

BACKGROUND OF THE INVENTION

Field of the Invention

The present invention relates to a cockpit module for a vehicle, which enables a vehicle control panel or first row seats to be accommodated in a dashboard of the vehicle, and enables occupants of second row seats to utilize first row seat spaces or to use a large scale display through switchover to a second row preference mode in case that the vehicle control panel or the first row seats are accommodated in the dashboard of the vehicle.

Description of Related Art

Recently, as the development of autonomous vehicles has expanded, the driver's role has been more reduced, and schemes for more efficiently utilizing an internal space of the vehicle have been demanded to escape from the concept that the driver simply drives the vehicle or takes a rest on the seat inside the vehicle.

In a case of an existing 4-seater vehicle, a driver's seat and a passenger seat are located in a first row, and seats for remaining occupants are provided in a second row. In case that such a 4-seater vehicle can perform autonomous driving, all occupants have an equal status on four seats, and in case that a small number of occupants exist, it would be possible for the occupants to perform various activities in a wider space using other empty seating spaces.

In the instant case, if it is possible to completely accommodate the first row seats rather than using only the spaces obtained through sliding of the first row seats as first row seatbacks are folded and then slide forward, it would be possible for the second row seat occupant(s) to freely use the internal space of the vehicle using the whole space occupied by the first row seats. Accordingly, it has been required to develop a structure for implementing the above-described second row seat preference mode.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a cockpit module for a vehicle, which can completely accommodate a vehicle control panel or first row seats in a dashboard of the vehicle, operate vehicle interior functions, such as air conditioning and airbag, centering around second row seats by implementing a second row seat preference mode, and enable occupants of second row seats to utilize a wide space including the first row seat spaces or to watch a movie or the like through a large scale display.

In various aspects of the present invention, a cockpit module for a vehicle according to various exemplary embodiments of the present invention may include a dashboard provided in front or in the rear of an internal space of the vehicle; a control panel provided in an upper portion of the dashboard and configured of facilitating an occupant to operate the control panel by being accommodated in the dashboard when moving backward thereof and by being deployed toward the occupant when moving forward thereof; and a seat being accommodated in a lower portion of the dashboard in a folded state, and being disposed in a front facing the dashboard when being deployed to be provided to the occupant.

The seat may include a seatback and a seat cushion, and the seat may be configured to be folded through sliding or rotating of the seatback or the seat cushion.

The seat may have a rear side configured to be directed toward the internal space of the vehicle when being accommodated and to form the same surface as the surface of the dashboard.

The control panel may have a front side configured to be directed toward the internal space of the vehicle when being accommodated and to form the same surface as the surface of the dashboard.

In case that the control panel is deployed from the dashboard, the upper portion of the dashboard may be configured to slide in front or in the rear of the vehicle.

The seat may include first row seats and second row seats, and in a case of a second row seat preference mode, the control panel or the first row seats may be configured to be accommodated in the lower portion of the dashboard.

In case that the seat is accommodated in the lower portion of the dashboard, a floor duct corresponding to the accommodated seat among air ducts provided in the cockpit module may be configured to be closed.

In case that the seat is accommodated in the lower portion of the dashboard, an airbag corresponding to the accommodated seat among airbags provided in the cockpit module may be configured to be inactivated.

The airbag corresponding to the accommodated seat may include an airbag of the dashboard or the control panel assigned to the accommodated seat side and a curtain airbag adjacent to the accommodated seat.

A display may be provided on an upper end portion of the dashboard, and may be configured to be accommodated in a windshield of the vehicle or to be deployed toward the internal space of the vehicle through sliding or rotating.

The display may be configured to be deployed in case that the control panel or the seat is accommodated, and when being deployed, a slope of the display may be configured to be changed in accordance with an eye level of the occupant.

A rail may be provided on both sides of the display, and the display may be configured to slide in a longitudinal direction of the vehicle along the rail.

The vehicle may be an autonomous vehicle, and the control panel or the seat may be configured to be accommodated in the dashboard in an autonomous driving mode.

According to the cockpit module for a vehicle according to various exemplary embodiments of the present invention, the vehicle control panel or the first row seats may be completely accommodated in a dashboard of the vehicle, the vehicle interior functions, such as air conditioning, airbag, and the like, may be operated centering around the second row seats through implementation of the second row seat preference mode, and the occupants of the second row seats can utilize the wide space including the first row seat spaces or can watch a movie or the like through the large scale display.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
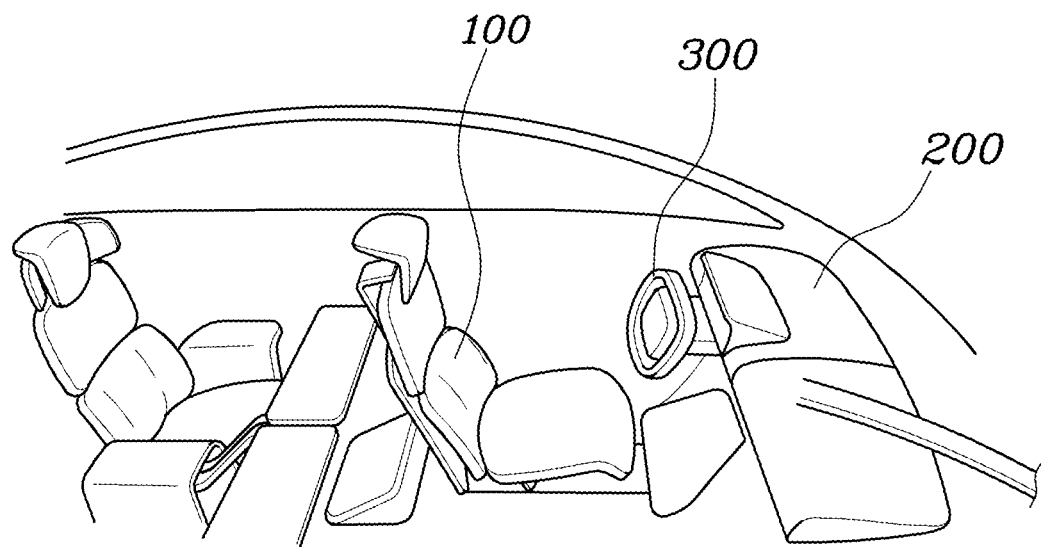
FIG. 1A and FIG. 1B are views exemplarily illustrating a cockpit module for a vehicle in which a seat and a control panel are accommodated in a dashboard according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 1B:
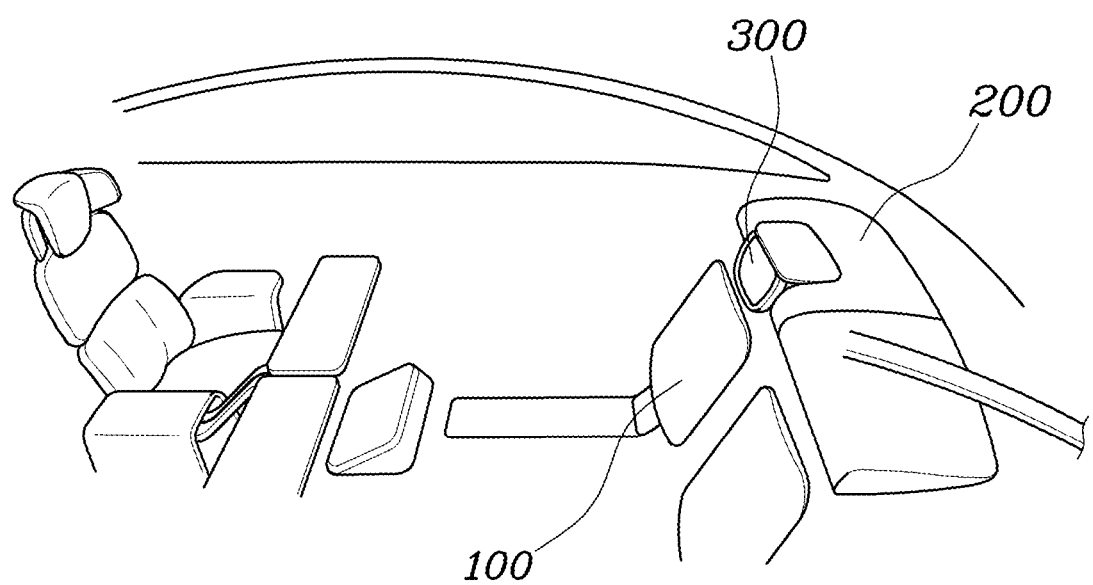
Figure 2:
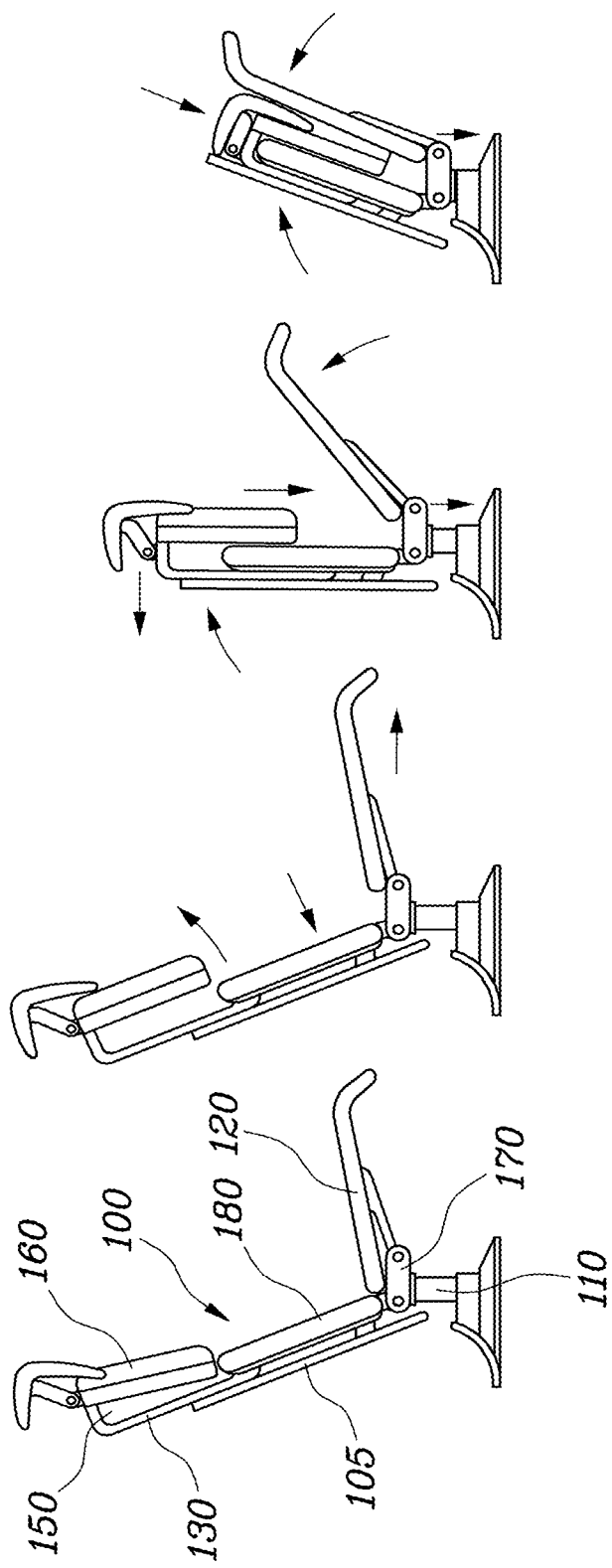
FIG. 2 is a view exemplarily illustrating that a seat is folded in a cockpit module for a vehicle according to various exemplary embodiments of the present invention.
Figure 3A:
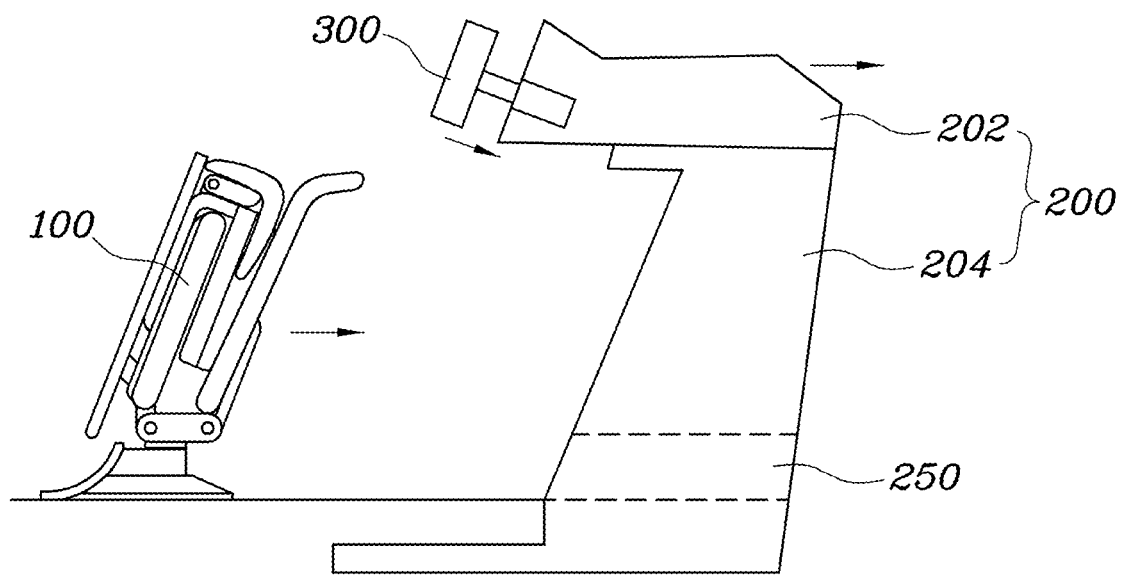
FIG. 3A and FIG. 3B are side views exemplarily illustrating that a seat and a control panel are accommodated in a dashboard and form the same surface as the surface of the dashboard in a cockpit module for a vehicle according to various exemplary embodiments of the present invention.
Figure 3B:
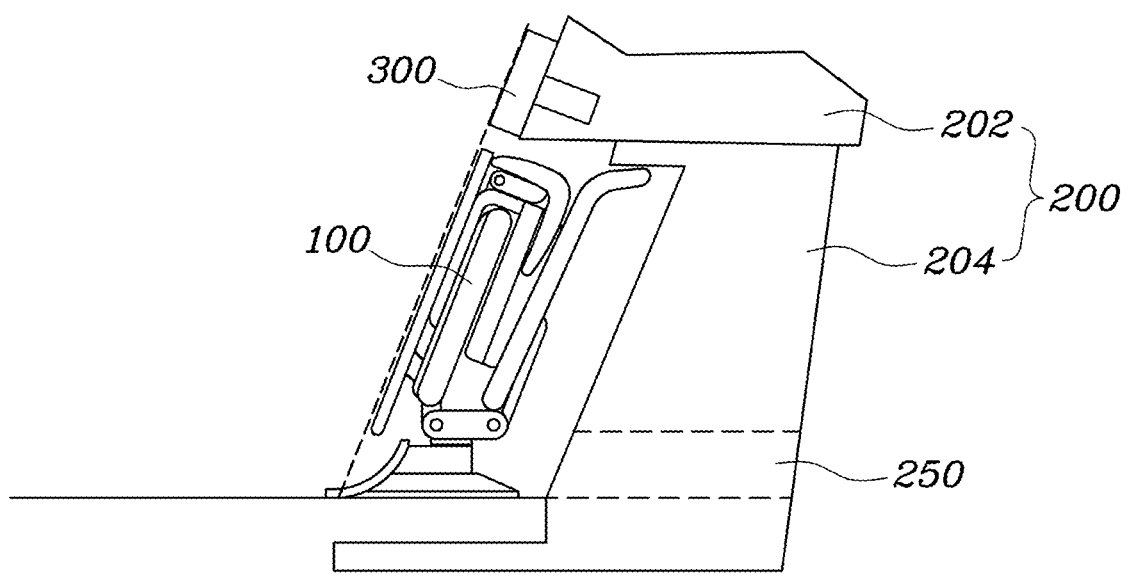
Figure 4:
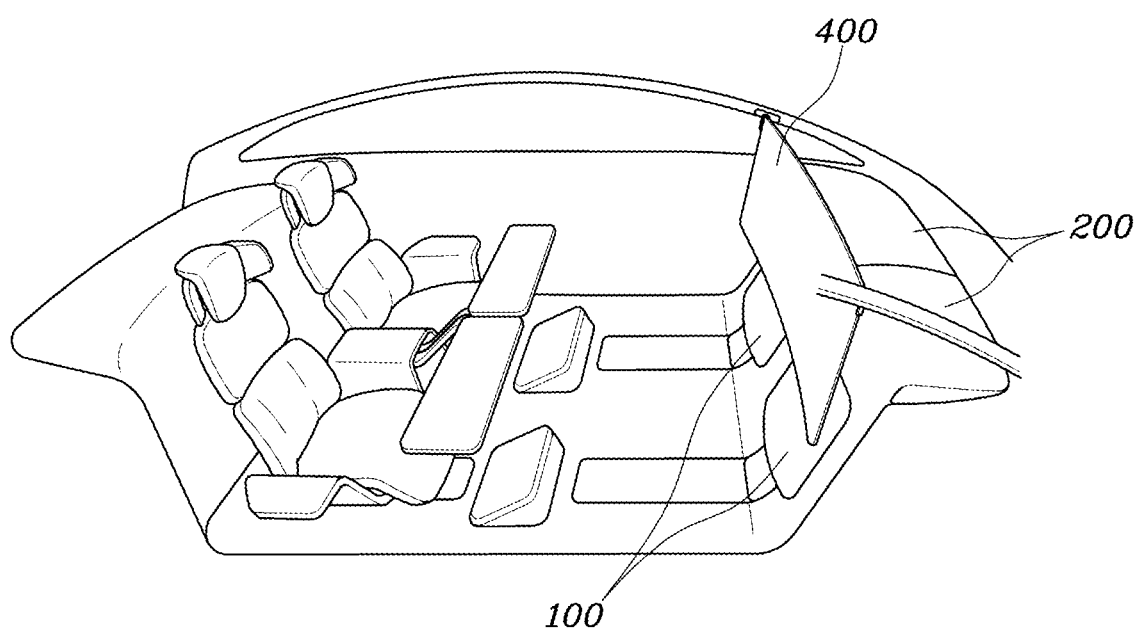
FIG. 4 is a view exemplarily illustrating a cockpit module for a vehicle in which a display is deployed in a state that a seat and a control panel are accommodated in a dashboard according to various exemplary embodiments of the present invention.

FIG. 1A and FIG. 1B are views exemplarily illustrating a cockpit module for a vehicle in which a seat and a control panel are accommodated in a dashboard according to various exemplary embodiments of the present invention. FIG. 2 is a view exemplarily illustrating that a seat is folded in a cockpit module for a vehicle according to various exemplary embodiments of the present invention. FIG. 3A and FIG. 3B are side views exemplarily illustrating that a seat and a control panel are accommodated in a dashboard and form the same surface as the surface of the dashboard in a cockpit module for a vehicle according to various exemplary embodiments of the present invention. FIG. 4 is a view exemplarily illustrating a cockpit module for a vehicle in which a display is deployed in a state that a seat and a control panel are accommodated in a dashboard according to various exemplary embodiments of the present invention.

FIG. 1A and FIG. 1B are views exemplarily illustrating a cockpit module for a vehicle in which a seat and a control panel are accommodated in a dashboard according to various exemplary embodiments of the present invention. FIG. 2 is a view exemplarily illustrating that a seat is folded in a cockpit module for a vehicle according to various exemplary embodiments of the present invention. A cockpit module for a vehicle according to various exemplary embodiments of the present invention includes a dashboard 200 provided in front or in the rear of an internal space of the vehicle; a control panel 300 provided on an upper portion of the dashboard and configured of facilitating an occupant to operate the control panel by being accommodated in the dashboard when moving backward thereof and by being deployed toward the occupant when moving forward thereof; and a seat 100 being accommodated in a lower portion of the dashboard in a folded state, and being disposed in a front facing the dashboard when being deployed to be provided to the occupant. Furthermore, the seat 100 may include a seatback and a seat cushion, and the seat 100 may be folded through sliding or rotating of the seatback or the seat cushion.

The seatback of the seat 100 includes an upper portion 130 and a lower portion 105, and a headrest 160 is provided on the upper portion 130 of the seatback, and the seat cushion 120 is provided on the lower portion 105 of the seatback. The lower portion 105 of the seatback is depressed to minimize the volume thereof, and then the upper portion 130 of the seatback projects forward and then slides downward. The headrest 160 also slides downward to minimize the volume thereof, and the seat cushion 120 is rotated upward to come in contact with the seatback. In in the instant state, the seatback and the seat cushion are rotated toward the dashboard 200 to complete folding.

In an exemplary embodiment of the present invention, a link 170 is fixed to a body 110 of the seat, the lower portion 105 is hingedly connected to the link 170, the upper portion 130 is slidably coupled to the lower portion 105 and the headrest 160 is pivotally coupled to the upper portion 130. The upper portion 130 is in an "L" shape to form an accommodation space 150. The seat cushion 120 is pivotally connected to the link 170. In this structure, the upper portion 130 of the seatback is configured to slide downward so that a support 180 mounted on the lower portion 105 is accommodated into the accommodating space 150. The seat cushion 120 is rotated upward with respect to the link 170 to come in contact with the headrest 160.

The folded seat 100 is completely accommodated in an accommodation space provided in the lower portion of the dashboard 200, and in case that the seat 100 is deployed, the lower body of a driver will be put in the accommodation space provided in the lower portion of the dashboard. As the seat 100 is completely accommodated in the dashboard 200 as described above, an occupant will be able to use the space having been occupied by the accommodated seat 100 in the vehicle.

Meanwhile, the control panel 300 may be a steering wheel, and the control panel 300 moves backward and is completely accommodated in the accommodation space provided in the upper portion of the dashboard 200. In case that the control panel 300 is deployed, an instrument panel or a display for displaying vehicle information may be provided in the accommodation space provided in the upper portion of the dashboard.

Furthermore, according to the cockpit module for the vehicle according to various exemplary embodiments of the present invention, the vehicle may be an autonomous vehicle, and the control panel 300 or the seat 100 may be accommodated in the dashboard 200 in the autonomous driving mode. In case that the vehicle is the autonomous vehicle, the control panel 300 is accommodated in the dashboard 200, whereas only in case that the vehicle is switched to a manual driving mode, the control panel 300 is deployed to enable the occupant to operate the vehicle. Furthermore, in case that the seat 100 is accommodated in the dashboard 200 in the autonomous driving mode, the internal space of the vehicle is expanded, and thus the occupant accommodated on another seat can use the expanded space.

FIG. 3A and FIG. 3B are side views exemplarily illustrating that a seat and a control panel are accommodated in a dashboard and form the same surface as the surface of the dashboard in a cockpit module for a vehicle according to various exemplary embodiments of the present invention. In the cockpit module for the vehicle according to various exemplary embodiments of the present invention, the rear side of the seat 100 may be directed toward the internal space of the vehicle when the seat 100 is accommodated, and may form the same surface as the surface of the dashboard 200. The seat 100 may be accommodated in a lower portion 204 of the dashboard 200 of the vehicle, and the rear side of the seat 100 which is directed toward the internal space of the vehicle forms the same surface as the surface of the lower portion 204 of the dashboard, which is directed toward the internal space of the vehicle. Accordingly, the seat 100 is completely accommodated in the lower portion 204 of the dashboard, and thus the internal space of the vehicle may be secured.

Meanwhile, in the cockpit module for the vehicle according to various exemplary embodiments of the present invention, the control panel 300 may have a front side which is directed toward the internal space of the vehicle when being accommodated and forms the same surface as the surface of the dashboard 200. The control panel 300 may be accommodated in an upper portion 202 of the dashboard 200, and in the same manner as the seat, the front portion thereof, which is directed toward the internal space of the vehicle when being accommodated, forms the same surface as the surface which is directed toward the vehicle interior space of the upper portion 202 of the dashboard. Accordingly, the control portion 300 is completely accommodated in the upper portion 202 of the dashboard, and thus the internal space of the vehicle may be secured, in case that the autonomous vehicle is in the autonomous driving mode, the control panel 300 is not necessary, and thus the control panel 300 is completely accommodated in the upper portion 202 of the dashboard, and will be deployed only in the manual driving mode.

Furthermore, in case that the control panel is deployed from the dashboard 200 in the cockpit module for the vehicle according to various exemplary embodiments of the present invention, the upper portion 202 of the dashboard may slide in front or in the rear of the vehicle. In case that the control panel 300 is deployed toward the occupant side, the upper portion 202 of the dashboard also slides toward the occupant side, and thus the control panel 300 may be closer to the occupant. As the control panel 300 becomes closer to the occupant, the occupant will be able to operate the vehicle safely. In case that the control panel 300 is accommodated in the upper portion 202 of the dashboard, the control panel 300 slides again to its original place, and thus the control panel 300 and the seat 100 are maintained to be completely accommodated in the dashboard 200 so that the control panel 300, the dashboard 200, and the seat 100 form the same surface in all.

Meanwhile, in the cockpit module for the vehicle according to various exemplary embodiments of the present invention, the seat 100 may include first row seats and second row seats, and in a case of a second row seat preference mode, the control panel 300 or the first row seats may be accommodated in the lower portion 204 of the dashboard 200. In case that the dashboard 200 is located in the front and two seats are located in each of the first row and the second row, based on a 4-seater vehicle, the first row seats are accommodated in the front dashboard 200, and thus the second row seat preference mode may be implemented. In general, the driver's seat and the passenger seat are located in the first row, and in a case of the autonomous vehicle, there is no concept between the driver's seat and the passenger seat in the autonomous driving mode, and there will be no problem in the driving even if the first row seats are accommodated in the dashboard 200. Accordingly, through the accommodation of the first row seats, the occupant on the second row seat will be able to use the expanded internal space of the vehicle.

Furthermore, in a case of using the cockpit module for the vehicle according to various exemplary embodiments of the present invention, all the first row seats or a portion of the first row seats may be accommodated in the autonomous driving mode of the 4-seater autonomous vehicle, or the second row preference mode, in which the first row seats are rotated to face the second row seats, may be implemented. In the second row preference mode, the importance of the second row seats becomes higher than the importance of the first row seats in which the existing driver's seat and passenger seat are located in the vehicle. Accordingly, in the second row preference mode, the vehicle interior functions, such as various kinds of control or air conditioning functions and airbag functions of the vehicle, may be changed to be performed centering around the second row seats.

Meanwhile, in the cockpit module for the vehicle according to various exemplary embodiments of the present invention, in case that the seat 100 is accommodated in the lower portion 204 of the dashboard 200, a floor duct 250 corresponding to the accommodated seat 100 among air ducts provided in the cockpit module may be closed. In case that the seat 100 is deployed, the floor duct 250 provided in the accommodation space formed in the lower portion 204 of the dashboard is opened to be used for air conditioning, whereas in case that the seat 100 is accommodated, the seat 100 intercepts the floor duct 250, and thus the floor duct 250 corresponding to the accommodated seat 100 cannot function well only to deteriorate the efficiency of the vehicle air conditioning even if the floor duct 250 is opened. Accordingly, in case that all or a portion of the first row seats is accommodated in the second row seat preference mode, all or a portion of the floor duct 250 corresponding to the accommodated first row seats will be closed to heighten the vehicle air conditioning efficiency. The front side duct or the upper side duct provided in the cockpit module may be used for the second row seats even if the first row seats are accommodated in the dashboard 200, and thus the vehicle air conditioning efficiency will not be degraded although the duct is not separately closed.

Furthermore, in the cockpit module for the vehicle according to various exemplary embodiments of the present invention, in case that the seat 100 is accommodated in the lower portion 204 of the dashboard 200, an airbag corresponding to the accommodated seat 100 among airbags provided in the cockpit module may be inactivated. The airbag corresponding to the accommodated seat includes an airbag of the dashboard or the control panel assigned to the accommodated seat side and a curtain airbag adjacent to the accommodated seat. In case that the seat 100 is accommodated, there is no occupant, and thus it is not necessary to operate the airbag. Accordingly, in case that all or a portion of the first row seats is accommodated in the second row seat preference mode, a steering airbag, a dashboard airbag, and an A-filler airbag corresponding to the accommodated first row seats will be inactivated.

FIG. 4 is a view exemplarily illustrating a cockpit module for a vehicle in which a display is deployed in a state that a seat and a control panel are accommodated in a dashboard according to various exemplary embodiments of the present invention. In the cockpit module for the vehicle according to various exemplary embodiments of the present invention, a display 400 is provided on an upper end portion of the dashboard 200, and the display 400 may be accommodated in a windshield of the vehicle or may be deployed toward the internal space of the vehicle through sliding or rotating. Furthermore, the display 400 may be deployed in case that the control panel 300 or the seat 100 is accommodated, and when the display 400 is deployed, a slope of the display 400 may be changed in accordance with an eye level of the occupant. Furthermore, a rail may be provided on both sides of the display 400, and the display 400 may slide in a longitudinal direction of the vehicle along the rail.

The display 400 may be a transparent display, and if not in use, the display 400 may be closely accommodated on the windshield of the vehicle, and may be used as augmented type navigation in consideration of vehicle operation information or an occupant's life style. Furthermore, the display 400 may be coupled to a rail located in both-end fillers of the vehicle and may slide in forward and backward directions thereof. The display 400 is deployed when the control panel 300 and the first row seats 100 are all accommodated in the dashboard 200 in the second row seat preference mode, and thus the occupant of the second row seat can comfortably watch a movie and the like using a wide screen without any indoor obstacle.

For example, the display 400 is closely accommodated on the windshield of the vehicle, and if the deployment thereof is necessary, the display 400 first moves forward using the rail so that the display 400 does not get caught by the dashboard 200. Thereafter, the display 400 is deployed through rotating downward through a hinge coupled to the filler. After being deployed, the display 400 may slide along the rail to adjust the location of the display 400, and thus the occupant of the second row seat can comfortably watch a movie and the like.

Meanwhile, in case that the occupant of the second row seat watches a movie and the like, the second row seat may be reclined to change the eye level of the occupant, and in the instant case, the display 400 may slide forwards and backwards through the rail as well as the angle of the display 400 may be adjusted in accordance with the eye level of the occupant. Through this, in the second row preference mode, the second row seat occupant can watch a movie and the like through the display 400 with the most comfortable posture desired by the occupant.

In a case of using the cockpit module for the vehicle according to various exemplary embodiments of the present invention, a more expanded internal space may be provided to the occupant in the autonomous driving mode of the autonomous vehicle, and in such an internal space, the occupant can sit on the second row seat and watch a movie and the like using a large-scale screen in a pleasant and comfortable reclined state. Furthermore, the vehicle interior functions may be operated and controlled around the second row seat.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A cockpit module for a vehicle, the cockpit module comprising:
    a dashboard provided in a front or in a rear of an internal space of the vehicle;
    a control panel provided in an upper portion of the dashboard and configured of facilitating an occupant to operate the control panel by being accommodated in the dashboard when moving backward thereof and by being deployed toward the occupant when moving forward thereof; and
    a seat configured for being accommodated in a lower portion of the dashboard in a folded state, and configured for being disposed in a front facing the dashboard when being deployed to be provided to the occupant,
    wherein the upper portion of the dashboard is slidably coupled to the lower portion of the dashboard.

2. The cockpit module according to claim 1, wherein the seat includes a seatback and a seat cushion, and the seat is configured to be folded through sliding or rotating of the seatback or the seat cushion.

3. The cockpit module according to claim 2,
    wherein the seatback includes a lower portion and an upper portion slidably coupled to the lower portion of the seatback, a headrest is pivotally connected to the upper portion of the seatback, and the seat cushion is provided on the lower portion of the seatback.

4. The cockpit module according to claim 3, the seat further includes a link fixed to a body of the seat,
    wherein the lower portion of the seatback is hingedly connected to a first end portion of the link,
    wherein the upper portion of the seatback is in an "L" shape to form an accommodation space, wherein the seat cushion is pivotally connected to a second end portion of the link, wherein when the upper portion of the seatback is configured to slide downward, a support mounted on the lower portion of the seatback is accommodated into the accommodating space, and wherein the seat cushion is configured to be rotated upward to come in contact with a front surface of the headrest.

5. The cockpit module according to claim 1, wherein the seat has a rear side configured to be directed toward the internal space of the vehicle when being accommodated and to form a same surface as a surface of the dashboard.

6. The cockpit module according to claim 1, wherein the control panel has a front side configured to be directed toward the internal space of the vehicle when being accommodated and to form a same surface as a surface of the dashboard.

7. The cockpit module according to claim 1, wherein when the control panel is deployed from the dashboard, the upper portion of the dashboard is configured to slide in a front or in a rear of the vehicle.

8. The cockpit module according to claim 1, wherein the seat includes first row seats and second row seats, and in a case of a second row seat preference mode, the control panel or the first row seats are configured to be accommodated in the lower portion of the dashboard.

9. The cockpit module according to claim 1, wherein when the seat is accommodated in the lower portion of the dashboard, a floor duct corresponding to the accommodated seat among air ducts provided in the cockpit module is configured to be closed.

10. The cockpit module according to claim 1, wherein when the seat is accommodated in the lower portion of the dashboard, an airbag corresponding to the accommodated seat among airbags provided in the cockpit module is configured to be inactivated.

11. The cockpit module according to claim 10, wherein the airbag corresponding to the accommodated seat includes an airbag of the dashboard or the control panel assigned to an accommodated seat side and a curtain airbag adjacent to the accommodated seat.

12. The cockpit module according to claim 1, wherein a display is provided on an upper end portion of the dashboard, and is configured to be accommodated in a windshield of the vehicle or to be deployed toward the internal space of the vehicle through sliding or rotating.

13. The cockpit module according to claim 12, wherein the display is configured to be deployed when the control panel or the seat is accommodated, and when being deployed, a slope of the display is configured to be changed in accordance with an eye level of the occupant.

14. The cockpit module according to claim 12, wherein a rail is provided on a first side and a second side of the display, and the display is configured to slide in a longitudinal direction of the vehicle along the rail.

15. The cockpit module according to claim 1, wherein the vehicle is an autonomous vehicle, and the control panel or the seat is configured to be accommodated in the dashboard in an autonomous driving mode.

* * * * *